Oct. 11, 1949.  R. KELLER  2,484,513
ELECTRICAL PRIMARY REGULATOR
Filed Feb. 18, 1944
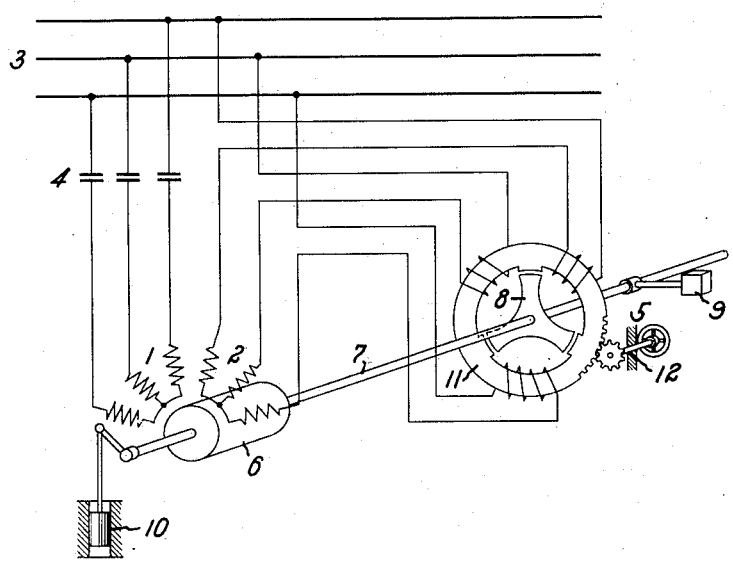
Inventor
Robert Keller,
By Pierce & Scheffler,
Attorneys.

Patented Oct. 11, 1949

2,484,513

UNITED STATES PATENT OFFICE

2,484,513

ELECTRICAL PRIMARY REGULATOR

Robert Keller, Ennetbaden, Switzerland, assignor to Aktiengesellschaft Brown, Boveri & Cie, Baden, Switzerland Application February 18, 1944, Serial No. 522,992
In Switzerland February 15, 1943

Section 1, Public Law 690, August 8, 1946
Patent expires February 15, 1963

3 Claims. (Cl. 175—335)

For regulating the speed of prime movers, for instance turbines, it is known to use electrical regulators, whereby it is possible to avoid the difficulties encountered with mechanical governors as regards the mechanical transmission of the machine speed to the pendulum of the centrifugal governor. When an electrical regulator is used, the speed or frequency of the machine is measured directly by means of a regulator measuring system. Most such systems are, however, constructed in such a manner that the regulator has an astatic characteristic (astatic regulator), which means that the regulator operates in dependence on a single quantity, this quantity being regulated to a practical constant value for every position of the regulating element. The rotatable element of the regulator is therefore in equilibrium in every position. This results in the regulator "hunting," as the correction is applied until the measured quantity reaches its preselected value and, in general, the effects of the correction continue for some time after the removal of the correction. As a result of this phenomenon it is desirable to give the regulator a static characteristic whereby this hunting is prevented by neutralizing the corrective action before the measured quantity reaches the preselected value, such rebalance being effected at a new operating value that differs somewhat from the preselected value. This rebalancing is in itself not a difficult matter as long as the necessary neutralization of the corrective action is small. When, however, a large rebalancing action is required it has been found that the static regulating systems hitherto known have proved to be inadequate for the purpose, because the rebalance is effected by mechanical means.

The object of the invention is therefore to give an electrical primary regulator a static characteristic by the addition of an opposing force which is produced electrically and in such a manner that the speed variation attains the high value required for the regulation of a prime mover. According to the invention this is achieved by coupling the rotatable system of the regulator mechanically to an additional electrical rotatable system which when it rotates influences in such a manner an electrical quantity of the measuring system of the regulator which determines the calculated frequency, that the regulator can be given any desirable static characteristic. The two rotatable systems are coupled in such a manner that when a rotational movement occurs which produces a change in the electrical quantity which fixes the predetermined or normal operating frequency and at the same time causes a variation in torque, these two changes assist each other to form the static characteristic of the regulator.

A constructional example of the invention is illustrated diagrammatically in the accompanying drawing where an electrical primary regulator is shown which is for instance used for regulating the speed of a hydraulic turbine that drives a generator, neither of which have been shown in the figure.

Contrary to the centrifugal pendulum governor the electrical regulator does not measure the speed but the frequency of the generator driven by the turbine. The frequency measuring system consists of a motor device having a rotor 6 and two excitation circuits 1, 2 which are connected to the network 3 supplied by the generator. Excitation circuit 1 contains a capacitance 4 and the other excitation circuit 2 a self-inductance 5 which is in the form of a three-phase choke coil. The rotor 6 of the motor device in which a torque is produced when the currents in the two opposed windings 1, 2 are unequal, is rigidly connected over the shaft 7 with the rotatable core 8 of the choke coil 5. On the shaft 7 is also an arm extending outwardly, at the end of which is secured a weight 9, which functions automatically to rotate the shaft 7 in such direction as to shut off the motive power supply to the turbine should the output voltage of the generator element fail, whilst 10 is the usual dashpot damping device.

The method of operation of the regulator is as follows. At a certain speed or predetermined frequency the effects of the excitation circuits 1, 2 equalize each other and the rotor 6 remains at rest. As soon as a change in frequency occurs, however, the currents in the two excitation windings 1, 2 become unequal and a torque is exerted on the rotor 6, in one or the other direction, depending upon whether the influence of the capacitance 4 or that of the inductance 5 predominates. When the rotor 6 rotates the core 8 of the choke coil 5 will also be given a corresponding rotation. This displacement of the choke coil core 8 relative to the wound stationary stator 11 causes a change in the self-inductance of the choke coil, with the result that a torque occurs in the rotating core 8 which opposes the torque of the rotor 6, thereby bringing the control shaft 7 to rest at a new position corresponding to a departure from the preselected frequency of normal operation. At the same time as the core 8 is rotated the preselected or normal operating frequency of the regulator will be correspondingly affected by the change in the self-inductance of the choke coil. The magnitude of the counter-torque as well as the change in the operating frequency depend upon the angular position of the core 8 and this determines the rebalancing conditions or static working characteristic of the regulator. In order to enable the regulator to be readjusted to the originally selected frequency or to prevent it from having too great a permanent frequency variation, it is necessary to provide the stator 11 of the choke coil with an adjusting device, which is indicated at 12 and enables the position of the stator 11 relative to that of the core 8 to be altered. This device 12 enables the operating frequency to be adjusted as desired within certain limits and by this means it is possible to obtain an isochronous regulation. When the network voltage disappears entirely the motive power supply to the turbine is completely shut off by the closing device 9.

Under certain conditions it may be an advantage to connect the rotor 6 of the regulator measuring system flexibly instead of rigidly with the core 8 of the choke coil. In such a case a spring is inserted between the measuring system and the choke coil core, whereby according to the strength of this spring different mutual displacements can be obtained for the rotor 6 and the rotatable core 8. By this means it is possible to influence the magnitude of the temporary static characteristic.

With the regulator according to the invention the great advantage is that without specially complicated devices it is possible to obtain a sufficiently high static characteristic by electrical means. When compared with existing regulators the new regulator is distinguished by its great simplicity.

I claim:

1. In an electrical regulator for a multi-phase power source, a motor device including a rotor and pairs of parallel connected frequency responsive excitation circuits individual to each phase of said source for operating said rotor in one direction or the other upon a departure in frequency of said source from a preselected value, one of said circuits of each pair consisting of a motor winding and a reactance of a predominantly capacitative character series connected with said winding and the other circuit of each pair consisting of a second motor winding and a reactance of a predominantly inductive character series connected with said second winding, said inductive reactances being comprised of choke coils wound upon a single stator member and a single rotatable core member within said stator and constituting a part of the magnetic circuit of said stator member for varying the respective inductances of said coils, said core member being mechanically coupled to said rotor and exerting a torque upon said rotor counter to the torque produced by said motor windings.

2. In an electrical regulator, the invention as defined in claim 1, in combination with means for adjusting the stator member and its coils angularly with respect to said core member.

3. In an electrical regulator, the invention as defined in claim 1 wherein said rotor is rigidly coupled to said core member.

ROBERT KELLER.

REFERENCES CITED

The following references are of record in the file of this patent:

UNITED STATES PATENTS

| Number | Name | Date |
|---|---|---|
| 649,006 | Steinmetz | May 8, 1900 |
| 1,610,628 | Staege | Dec. 14, 1926 |
| 1,663,086 | Long | Mar. 20, 1928 |
| 1,906,439 | Warren | May 2, 1933 |
| 2,254,918 | Schwaiger | Sept. 21, 1941 |
| 2,260,122 | Moore | Oct. 21, 1941 |